United States Patent
Wernze et al.

(10) Patent No.: US 8,527,411 B2
(45) Date of Patent: Sep. 3, 2013

(54) MASS BILLING SYSTEMS AND METHODS

(75) Inventors: Frank Wernze, Muenster (DE);
Andreas Meider, Cologne (DE)

(73) Assignee: SAP AG, Walldorf (DE)

( * ) Notice: Subject to any disclaimer, the term of this patent is extended or adjusted under 35 U.S.C. 154(b) by 63 days.

(21) Appl. No.: 11/607,985

(22) Filed: Dec. 4, 2006

(65) Prior Publication Data

US 2008/0133406 A1  Jun. 5, 2008

(51) Int. Cl.
*G06Q 40/00*  (2012.01)

(52) U.S. Cl.
USPC .............................. 705/40; 710/100; 709/206

(58) Field of Classification Search
USPC ............................ 705/40; 710/100; 709/206
See application file for complete search history.

(56) References Cited

U.S. PATENT DOCUMENTS

| | | | |
|---|---|---|---|
| 6,745,229 B1 * | 6/2004 | Gobin et al. | 709/206 |
| 2002/0147867 A1 * | 10/2002 | Satlow | 710/100 |

* cited by examiner

*Primary Examiner* — Daniel Felten
(74) *Attorney, Agent, or Firm* — Finnegan, Henderson, Farabow, Garrett & Dunner LLP

(57) ABSTRACT

Methods and systems, including computer program products, consistent with the invention may manage invoices for a customer. For example, methods consistent with the invention may obtain customer transaction data reflecting transactions made by the customer. The method may then generate, from the obtained customer transaction data, compressed transaction data and detailed transaction data, wherein the compressed transaction data without the detailed transaction data is used to generate an invoice to the customer. The method may then provide the compressed transaction data to a service processor for performing invoice management functions based on the compressed transaction data.

24 Claims, 3 Drawing Sheets

MASS BILLING SYSTEMS AND METHODS

FIELD OF THE INVENTION

The present invention generally relates to data processing. More particularly, the present invention relates to systems and methods for processing data in a mass invoicing environment.

BACKGROUND OF THE INVENTION

Invoicing is an important if not indispensable part of today's business transactions. Generally speaking, an invoice is a commercial document issued by one business partner to another, evidencing a transaction in which terms such as the products or services, their quantities, and agreed prices are indicated. The issuance of the invoice from one business partner to another signifies that payment is due from the partner receiving the invoice to the partner posting the invoice according to the agreed terms of the invoice. It is typical for the invoice to also include references to prior documents, such as purchase orders, goods receipt, and other documents that have been produced in connection with the business transaction.

Invoicing may also require, in certain applications, the management of large volumes of data. In particular, an invoicing system often must analyze large volumes of data to produce reports and generate the invoices. For example, an invoicing system may be part of a toll collection system for automotive highways, where customers have an account that is charged each time the customer passes a toll collection station on the highway. Such a system may have hundreds of thousands of customers to invoice. And each customer may have hundreds of transactions to be billed (e.g., for companies operating a fleet of 1000 trucks, an invoice can easily contain thousands of line items based on each time a driver drives through a toll collection station). As a result, the invoicing system may need to process a massive amount of data each billing period.

Due to the large amount of data, many businesses have expanded their reliance on electronically stored data and, as a result, use databases, servers, and networks to process the large amount of data. However, processing resources are limited. For example, a large billing invoice may take a typical computing system a significant amount of time to generate. When generating an invoice, the system may be unable to work on other tasks, such as processing customer relationship management (CRM) interactions.

In view of the foregoing, there is a need for systems, methods, and computing tools that effectively and efficiently assist in the management, generation, and distribution of invoices, including mass invoices.

SUMMARY OF THE INVENTION

The present invention provides methods and apparatus, including computer program products, for managing invoices, such as invoices for mass data.

In one exemplary embodiment, there is provided a method for managing invoices for a customer. The method may obtain customer transaction data reflecting transactions made by the customer. The method may then generate, from the obtained customer transaction data, compressed transaction data and detailed transaction data, wherein the compressed transaction data without the detailed transaction data is used to generate an invoice to the customer. The method may then provide the compressed transaction data to a service processor for performing invoice management functions based on the compressed transaction data.

In a second exemplary embodiment, there is provided a computer-readable medium containing instructions to configure a processor to perform a method for managing invoices for a customer. The method may obtain customer transaction data reflecting transactions made by the customer. The method may then generate, from the obtained customer transaction data, compressed transaction data and detailed transaction data, wherein the compressed transaction data without the detailed transaction data is used to generate an invoice to the customer. The method may then provide the compressed transaction data to a service processor for performing invoice management functions based on the compressed transaction data.

In a third exemplary embodiment, there is provided a system for managing invoices for a customer. The system may comprise a processor and a memory, wherein the processor and the memory are configured to perform a method. The method may obtain customer transaction data reflecting transactions made by the customer. The method may then generate, from the obtained customer transaction data, compressed transaction data and detailed transaction data, wherein the compressed transaction data without the detailed transaction data is used to generate an invoice to the customer. The method may then provide the compressed transaction data to a service processor for performing invoice management functions based on the compressed transaction data.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Systems and methods consistent with the present invention provide users with the ability to effectively and efficiently assist in the management, generation, and distribution of invoices, including mass invoices. As used herein, the term "invoice" refers to a document, such as a bill, issued by a business entity to a customer, evidencing one or more transactions in which terms such as the products or services, their quantities, agreed prices, and amount due may be indicated. Such invoices may be a hard or paper copy, as well as in electronic form. Further, in exemplary embodiments, invoices may indicate only aggregate or summary information to a customer, as opposed to detailed information on each transaction made by the customer.

As further disclosed herein, embodiments consistent with the present invention may be implemented to generate mass invoices. As used herein, the terms "mass invoices" or "mass invoicing" refer to invoices that are generated using mass or large quantities of data. Examples of mass invoices include reports for large organizations, which may be produced according to a schedule, such as by month, quarter, or year, for example. Embodiments of the present invention may be used with various solutions and within numerous environments. By way of example, embodiments of the invention may be implemented in computerized systems or methods that incorporate business solutions from SAP AG (Walldorf, Germany).

Figure 1A:
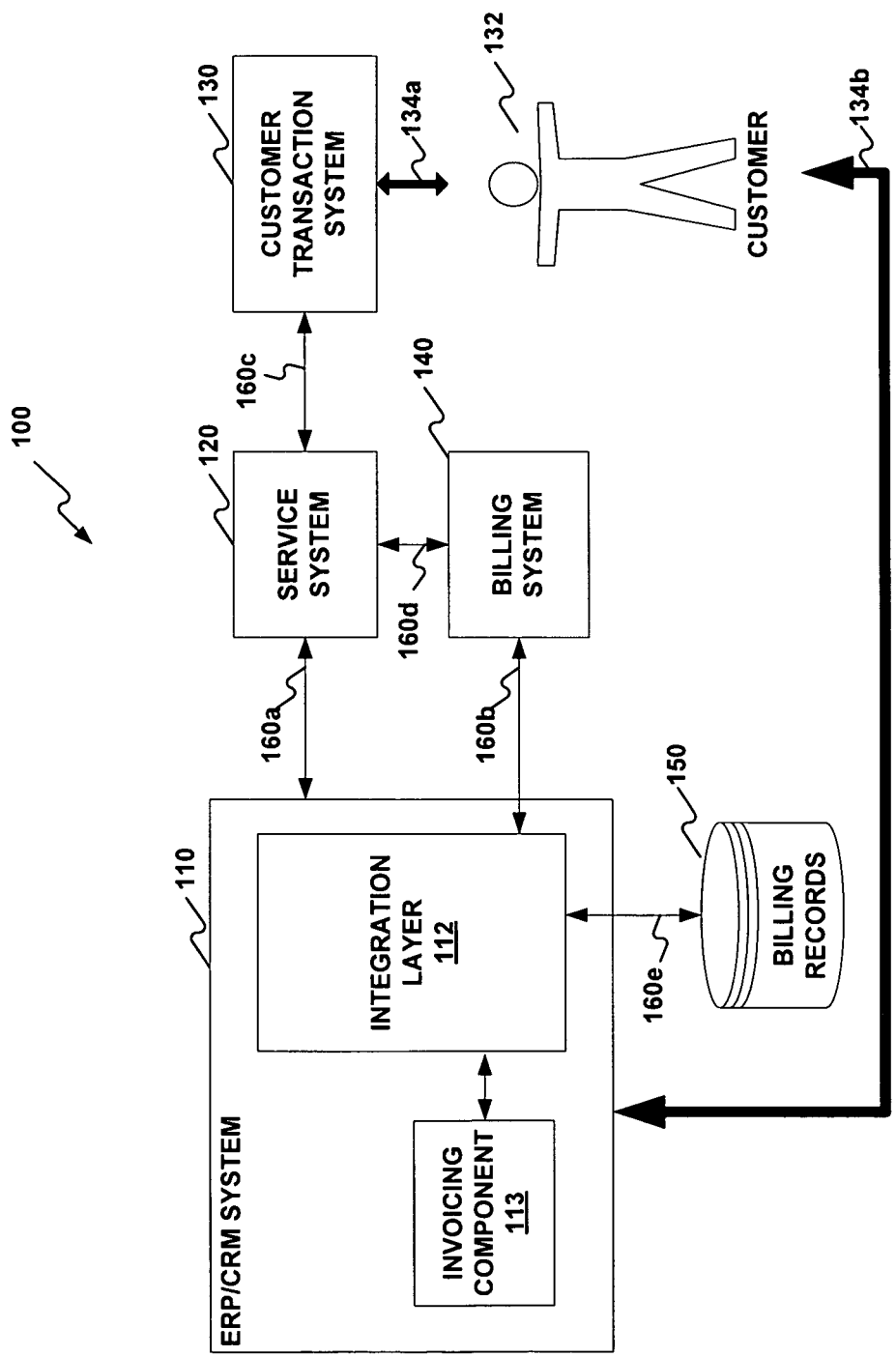
FIGS. 1A and 1B illustrate diagrams of exemplary system environments consistent with certain aspects related to the present invention.

FIG. 1A is a block diagram of an exemplary system 100 environment for processing invoices. As shown in FIG. 1A, system 100 may include an enterprise resource planning (ERP) system and/or a customer relationship management (CRM) system 110, a service system 120, a customer transaction system 130, a billing system 140, and a billing records database 150. Each of the components of system 100 may be connected or communicate with one another via communication links 160. Further, the components depicted in FIG. 1A may be distributed among multiple locations or located at a single location.

ERP/CRM system 110 may manage customer accounts for an enterprise based on compressed transaction data. As used herein, compressed transaction data refers to data reflecting total or summary transaction information. Compressed transaction data thus differs from detailed transaction data reflecting each individual transaction made by a customer. Examples of compressed transaction data may include a customer's outstanding balance and total charges made during a particular billing period. Tasks that ERP/CRM system 110 may perform include tracking outstanding balances, generating notices to customers based on overdue payments, applying discounts based on a customer's transaction totals, as well as performing any other task based on compressed transaction data associated with a customer's account. ERP/CRM system 110 may also perform other tasks that do not require detailed transaction data, such as registering a new customer with system 100. ERP/CRM system 110 may thus include rules or logic for performing these types of tasks based on, for example, compressed transaction data received from billing system 110, as described below, for a particular customer.

In exemplary embodiments, ERP/CRM system 110 may thus be a type of software application system that provides one or more services, such as generating customer records and managing customer accounts based on transaction data included within the customer records. The services may be accessible to other parts of system 100 through a communication mechanism, such as communication links 160. ERP/CRM system 110 may be constructed, for example, using ERP and/or CRM tools that are commercially available from SAP AG (Walldorf, Germany). ERP/CRM system 110 may, however, be implemented using any type of software application system, and need not, for example, include actual ERP or CRM tools.

Service system 120 may receive customer records from ERP/CRM system 110 and track customer transactions. To this end, service system 120 may communicate with customer transaction system 130, which obtains transaction data from customers, such as customer 132. For example, system 100 may relate to a tolling system for an interstate highway system. Customer 132 may thus be a vehicle having a radio frequency ID tag that allows customer transaction system 130 to identify the vehicle as it passes customer transaction system 130 located at a tolling station. When customer transaction system 130 detects the passing of the vehicle (e.g., as depicted by arrow 134*a*), transaction system 130 may generate unstructured transaction data for outputting to service system 120. For instance, the unstructured transaction data may identify an ID associated with customer 132, a date customer 132 passed customer transaction system 130, and a detected event. The detected event may, for example, simply identify the amount of miles or kilometers traveled by customer 132 (e.g., when customer transaction system 130 may include components located at the interstate entrances and exits) or may be based on where in the highway system customer 132 was detected by customer transaction system 130 (e.g., by a GPS coordinate of the customer's vehicle). In such exemplary implementations of system 100, service system 120 may track transaction data for hundreds of thousands of customers 132, with each customer generating potentially hundreds of transactions per billing or invoicing period.

Service system 120 may obtain the unstructured transaction data from customer transaction system 132 and associate that data with a customer record of the corresponding customer. Service system 120 may format the unstructured transaction data into structured transaction data, such that the data may then reflect an actual service or product to be billed to the customer. For instance, the unstructured data may reflect a detected GPS coordinate of the customer's vehicle, while the structured data may identify an actual trip (e.g., based on two GPS values) for which system 100 may invoice the customer. Service system 120 may be an application specific software application. Further, in exemplary embodiments, service system 120 is located external to ERP/CRM system 110, such that service system 120 may perform its processing independently of that performed by ERP/CRM system 110.

Billing system 140 may receive structured customer transaction data from service system 120. As described below, billing system 140 may generate compressed transaction data to provide to ERP/CRM system 110 for generating an invoice to customer 132 (as depicted by arrow 134*b*). When customer 132 pays the invoice, the customer's payment may be received and accounted for by ERP/CRM system 110 (as also depicted by arrow 134*b*). Billing system 140 may be implemented by using a dedicated high-speed billing system, such as billing solutions commercially available from Highdeal, SA (Caen, France).

To prepare the compressed transaction data, billing system 140 may store master invoicing data of the invoicer or biller. Such master invoicing data may include billing rates, charges, discounts and account information, for example. Billing system 140 may apply this master invoicing data to the received structured data to generate the compressed transaction data and the detailed transaction data.

As shown in FIG. 1A, billing system 140 may communicate with ERP/CRM system 110. FIG. 1A illustrates that ERP/CRM system 110 may further include an integration layer 112 and an invoicing component 113. Integration layer 112 may include one or more modules that interface with service system 120 and billing system 140, as well as other components of system 100. Integration layer 112 enables ERP/CRM system 110 to exchange data (e.g., by posting or transferring data) and perform actions, such as obtaining, from billing system 140, compressed transaction data for invoicing component 113 or detailed transaction data for billing record database 150. Interface layer 112 may require data transferred to or from billing system 140 (e.g., via link 160b) comply with predefined data format requirements. These format requirements may require that data comply with an Event Data Record (EDR) format. For example, the data format may include an EDR header containing general transaction data, such as a timestamp, price, currency, service type, customer ID, etc, and an EDR details including more detailed information about the particular transaction, such as trip length, duration, start time, end time, road name, etc.

Integration layer 113 may communicate the compressed transaction information to invoicing system 113 of ERP/CRM system 110. Invoicing component 113 may then send invoices to customer 132 (as depicted by arrow 134b) based on the compressed transaction information. In exemplary implementations, invoicing component 113 may be an ERP Invoicing system that is commercially available from SAP AG (Walldorf, Germany).

Billing record database 150 may store invoicing records generated by invoicing system 113. In one embodiment, database 150 may store invoice data in an XML format, which may have a predefined schema. Systems consistent with the invention may use other formats, however. For example, database 150 may store invoice data in a table form using relational databases or may store invoice data as a business object. The invoicing records stored in billing record database 150 may include the detailed transaction information, which system 100 may use, in certain embodiments, to prepare detailed service usage statements.

Network connections 160a-160e may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide network connections 160a-160e. Moreover, network connections 160a-160e may be embodied using bi-directional, unidirectional, or dedicated communication links. Network connections 160a-160e may also implement standard transmission protocols, such as Transmission Control Protocol/Internet Protocol (TCP/IP), Hyper Text Transfer Protocol (HTTP), SOAP, RPC, or other protocols.

As described, systems consistent with the present invention implementing the architecture of FIG. 1A may process mass invoices more efficiently. In particular, systems consistent with the invention may separate the compressed transaction data from the detailed transaction data. By doing so, billing system 140 may provide the compressed transaction data to ERP/CRM system 110' for invoicing component 113 to use in sending an invoice to a customer 132. ERP/CRM system 110 may thus process only the compressed transaction data, without the added burden of also processing the detailed transaction data, in performing the functions of ERP/CRM system 110 and invoicing component 113.

Figure 1B:
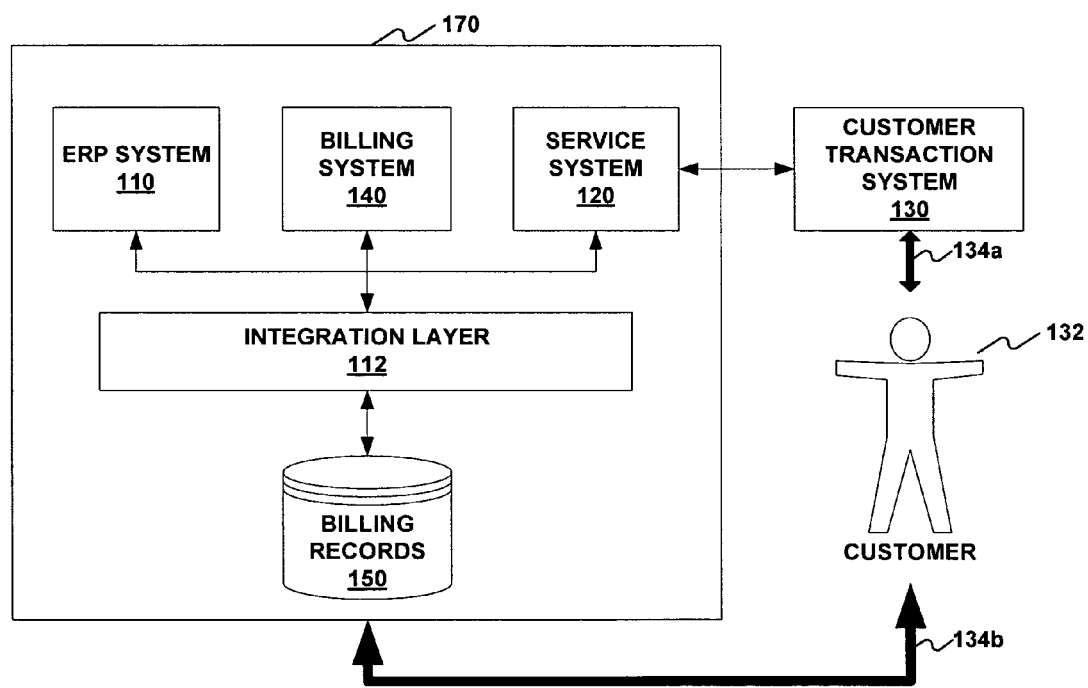

FIG. 1B illustrates an alternative embodiment consistent with additional aspects of the invention. As shown in FIG. 1B, ERP/CRM system 110, service system 120, and billing system 140 may reside on a single computing platform 170. Integration layer 112 may thus be used to integrate the functions of systems 110, 120, and 140 into a single platform. Here, in the embodiment of FIG. 1B, platform 170 may be implemented by using billing solutions commercially available from SAP AG (Walldorf, Germany). For example, billing system 140 may be implemented by a SAP ERP Billing tool and integration layer 112 may be implemented by using SAP NetWeaver, each of which are commercially available from SAP AG. Further, database 150 of FIG. 1B may be implemented by using a relational database management system, such as MaxDB, as known to those skilled in the art. By using a database management system, such as MaxDB, systems consistent with the exemplary embodiment of FIG. 1B may use the RAM of platform 170, as opposed to peripheral memory devices, such as hard disk based mass storage.

Figure 2:
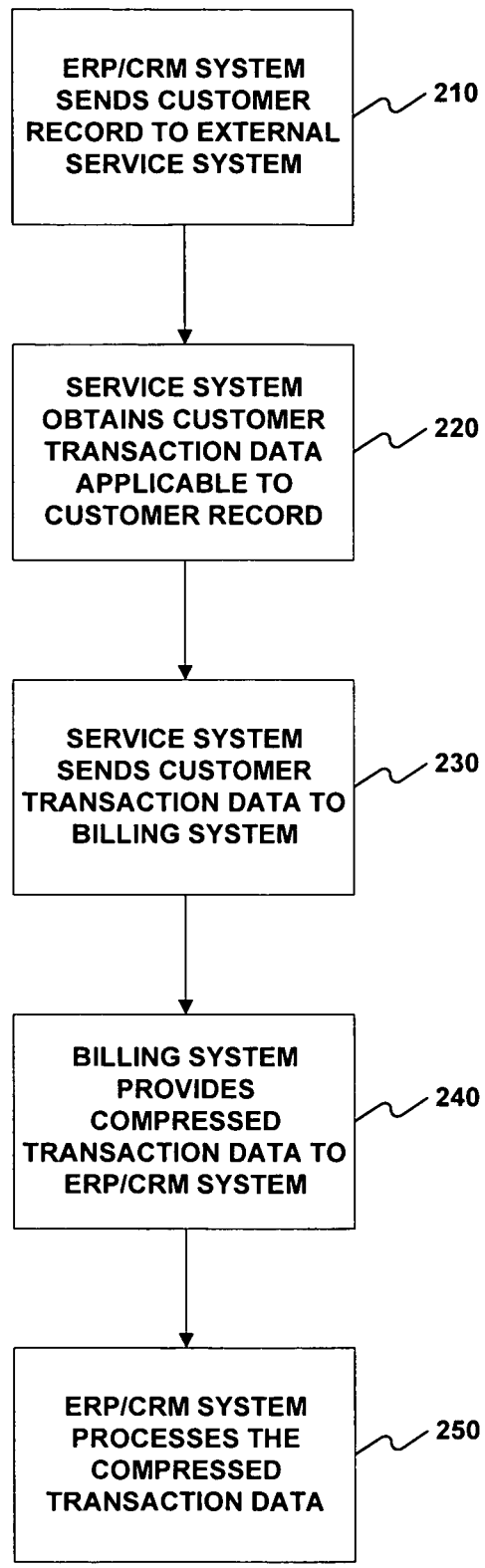
FIG. 2 illustrates an exemplary flow diagram for generating mass bills consistent with the present invention.

FIG. 2 illustrates a flow diagram of an exemplary process, consistent with the present invention, for managing mass invoices. As shown in FIG. 2, the process may begin by ERP/CRM system 110 sending a customer record to service system 120 (stage 210). ERP/CRM system 110 may generate a customer record when, for example, a new customer registers with the system 100. The customer record may include information identifying the customer (e.g., name, account number, address, etc.), services or products the customer may purchase, forms of acceptable payment, a structure for invoices sent to the customer, and types of rates, fees, discounts, or invoicing procedures applicable to the customer, such as a price plan.

Service system 120 may then obtain customer transaction data applicable to the provided customer record (stage 220). The transaction data may be unstructured event information received from customer transaction system 130. Unstructured event information may, for example, include geo-coordinates representing a usage of a road. Several events belonging together may represent a trip using the road (where the trip is a chargeable event to the customer) and thus be packaged by service system 120 as structured transaction data. Thus, the structured transaction data may reflect each particular transaction made by a customer (e.g., each toll paid using a road).

Service system 120 may then send the customer transaction data to billing system 140 (stage 230). The customer transaction data received by billing system 140 may include the detailed transaction data and the compressed transaction data. In exemplary embodiments, however, billing system 140 may receive structured transaction data from service system 120 and generate the detailed and compressed transaction data. As described above, the compressed transaction data may reflect total or summary transaction information within a specific period using a specific service (e.g., the total amounts of tolls paid for a particular month for a particular vehicle using a particular service). Billing system 140 may thus rate the customer transaction data based on data included in the customer record for the customer, so a price per transaction data may be determined. As described above, billing system 140 may be implemented by using a commercially available billing solution from Highdeal (Caen, France) for generating the detailed and compressed transaction data.

Billing system 140 may provide the compressed transaction data to ERP/CRM system 110 (stage 240). For example, billing system 140 may post and/or transfer the compressed transaction data to ERP/CRM system 110. Consistent with the present invention, the posting and transferring operation may include posting the compressed transaction data to invoicing component 113.

ERP/CRM system 110 may then process the compressed transaction data (stage 250). For example, ERP/CRM system 110 may manage customer accounts for an enterprise associated with system 100 based on compressed transaction data. Tasks that ERP/CRM system 110 may perform include tracking outstanding balances, generating notices to customers based on overdue payments, applying discounts based on a customer's transaction totals, as well as performing any other task based on compressed transaction data associated with a customer's account. As described above, ERP/CRM system 110 may also perform other tasks that do not require detailed transaction data, such as registering a new customer with system 100. Further, invoicing component 113 of ERP/CRM system 110 may use the compressed transaction data to generate an invoice for distribution to customer 132.

For purposes of explanation only, certain aspects and embodiments are described herein with reference to the components illustrated in FIGS. 1-2. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited td the illustrated environments.

Further, the sequences of events described in FIGS. 1-2 are exemplary and not intended to be limiting. Thus, other methods may be used, and even with the methods depicted in FIGS. 1-2, the particular order of events may vary without departing from the scope of the present invention. Moreover, certain stages may not be present and additional stages may be implemented in FIGS. 1-2. Also, the processes described herein are not inherently related to any particular apparatus and may be implemented by any suitable combination of components. For example, systems consistent with the invention may use automated or manual correction procedures other than those using a reconciliation message.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for managing invoices for a customer, the method comprising:
    obtaining, by a computer, customer transaction data reflecting individual transactions for a service or product provided to a customer, the customer transaction data including structured data generated from unstructured data reflecting events associated with the service or product;
    generating, by the computer, total transaction data and detailed transaction data from the obtained customer transaction data, wherein the total transaction data reflects total transaction amounts during a billing period and the detailed transaction data describes the individual transactions made by the customer during the billing period;
    separating, by the computer, the total transaction data from the detailed transaction data;
    sending, by the computer, the detailed transaction data to a billing record database for storage therein, the detailed transaction data being stored as invoicing records including business objects; and
    sending, by the computer, the separate total transaction data from a first processing component to a second processing component for the second processing component to perform invoice management functions based on the total transaction data and without the detailed transaction data, the total transaction data being sent in an Event Data Record (EDR) format.

2. The computer-implemented method of claim 1, wherein a billing system obtains the customer transaction data, and wherein the billing system generates the total transaction data and the detailed transaction data.

3. The computer-implemented method of claim 1, further including:
    sending the total transaction data to the second processing component which generates the invoice.

4. The computer-implemented method of claim 1, further including:
    storing the detailed transaction data and total transaction data in a MaxDB relational database management system.

5. A non-transitory computer-readable medium containing instructions to configure a processor to perform a method for managing invoices for a customer, the method comprising:
    obtaining customer transaction data reflecting individual transactions for a service or product provided to a customer, the customer transaction data including structured data generated from unstructured data reflecting events associated with the service or product;
    generating, in a first processing component, total transaction data and detailed transaction data from the obtained customer transaction data, wherein the total transaction data reflects total transaction amounts during a billing period and the detailed transaction data describes the individual transactions made by the customer during the billing period;
    separating the total transaction data from the detailed transaction data;
    sending the detailed transaction data to a billing record database for storage therein, the detailed transaction data being stored as invoicing records including business objects; and
    sending the separate total transaction data from the first processing component to a second processing component for the second processing component to perform invoice management functions based on the total transaction data and without the detailed transaction data, the total transaction data being sent in accordance with an Even Data Record (EDR) format.

6. The non-transitory computer-readable medium of claim 5, wherein a billing system obtains the customer transaction data, and wherein the billing system generates the total transaction data and the detailed transaction data.

7. The non-transitory computer-readable medium of claim 5, further including:
    sending the total transaction data to the second processing component which generates the invoice.

8. The non transitory computer-readable medium of claim 5, further including:
    storing the detailed transaction data and total transaction data in a MaxDB relational database management system.

9. A system for managing invoices for a customer, the system comprising:
    a processor; and
    a memory, wherein the processor and the memory are configured to perform a method comprising:
        obtaining customer transaction data reflecting individual transactions for a service or product provided to a customer, the customer transaction data including structured data generated from unstructured data reflecting events associated with the service or product;
        generating, in a first processing component, total transaction data and detailed transaction data from the obtained customer transaction data, wherein the total transaction data reflects total transaction amounts during a billing period and the detailed transaction data describes the individual transactions made by the customer during the billing period;

separating the total transaction data from the detailed transaction data;

sending, by the computer, the detailed transaction data to a billing record database for storage therein, the detailed transaction data being stored as invoicing records including business objects; and sending the separate total transaction data from the first processing component to a second processing component for the second processing component to perform invoice management functions based on the total transaction data and without the detailed transaction data, wherein the total transaction data being sent in accordance with an Event Data Record (EDR) format.

10. The system of claim 9, wherein a billing system obtains the customer transaction data, and wherein the billing system generates the total transaction data and the detailed transaction data.

11. The system of claim 9, further including:

sending the total transaction data to the second processing component which generates the invoice.

12. The system of claim 9, further including:

a MaxDB relational database management system for storing the detailed transaction data and total transaction data.

13. The computer-implemented method of claim wherein a predefined data format is used to separate the total transaction data from the detailed transaction data.

14. The computer-implemented method of claim 1, wherein performing the invoice management functions further includes:

processing the total transaction data without processing the detailed transaction data.

15. The computer-implemented method of claim 1, wherein performing the invoice management functions further includes:

generating an invoice based on the total transaction and without the detailed transaction data.

16. The computer-implemented method of claim 1, wherein the second processing component and the first processing component are separate applications residing on a common computing platform, and wherein the second processing component processes the total transaction data without processing the detailed transaction data.

17. The non-transitory computer-readable medium of claim 5, wherein a predefined data format is used to separate the total transaction data from the detailed transaction data.

18. The non-transitory computer-readable medium of claim 5, wherein performing the invoice management functions further includes:

processing the total transaction data without processing the detailed transaction data.

19. The non-transitory computer-readable medium of claim 5 wherein performing the invoice management functions further includes:

generating an invoice based on the total transaction and without the detailed transaction data.

20. The non-transitory computer-readable medium of claim 5, wherein the second processing component and the first processing component are separate applications residing on a common computing platform, and wherein the second processing component processes the total transaction data without processing the detailed transaction data.

21. The system of claim 9, wherein a predefined data format is used to separate the total transaction data from the detailed transaction data.

22. The system of claim 9, wherein performing the invoice management functions further includes:

processing the total transaction data without processing the detailed transaction data.

23. The system of claim 9, wherein performing the invoice management functions further includes:

generating an invoice based on the total transaction and without the detailed transaction data.

24. The system of claim 9, wherein the second processing component and the first processing component are separate applications residing on a common computing platform, and wherein the second processing component processes the total transaction data without processing the detailed transaction data.

* * * * *